United States Patent [19]
Reilly

[11] Patent Number: 5,953,668
[45] Date of Patent: *Sep. 14, 1999

[54] RADIO CHANNEL MANAGEMENT FUNCTIONALITY DISTRIBUTION IN WIRELESS COMMUNICATION SYSTEM

[75] Inventor: Patrick L. Reilly, Chandler, Ariz.

[73] Assignee: AirNet Communications Corporation, Melbourne, Fla.

[ * ] Notice: This patent is subject to a terminal disclaimer.

[21] Appl. No.: 08/768,213

[22] Filed: Dec. 17, 1996

[51] Int. Cl.[6] .................................................. H04Q 7/38
[52] U.S. Cl. ........................ 455/442; 455/438; 455/561; 370/331; 370/337; 370/347
[58] Field of Search ..................... 455/436, 422, 455/424, 438, 443, 444, 449, 507, 403, 508, 509, 514, 560, 561, 445, 442, 439, 524, 525; 370/329, 330, 331, 332, 334, 336, 337, 341, 347, 362

[56] References Cited

U.S. PATENT DOCUMENTS 4,704,734  11/1987  Menich et al. .......................... 455/436
5,375,123  12/1994  Andersson et al. ..................... 455/67.3
5,539,923   7/1996  Matsumoto ............................. 455/443
5,648,962   7/1997  Pirinen ................................... 370/338

*Primary Examiner*—Wellington Chin
*Assistant Examiner*—Lee Nguyen
*Attorney, Agent, or Firm*—Farkas & Manelli, PLLC; Russell O. Paige

[57] ABSTRACT

A distributed processing architecture for a wireless communication system in which handover intelligence is distributed between the Base Station Subsystem (BSS), Base Station Controller (BSC) and Base Transceiver System (BTS). Mapping between air-interface traffic (Um) channels and Abis-interface traffic channel connections is dynamically assigned. This permits the BTS to manage information concerning active frequency channel assignments, individual channel measurement data, and intra-cell handover. The BTS therefore need only escalate the handover decision to the BSC level when the situation requires inter-cell handover.

18 Claims, 4 Drawing Sheets

RADIO CHANNEL MANAGEMENT FUNCTIONALITY DISTRIBUTION IN WIRELESS COMMUNICATION SYSTEM

FIELD OF THE INVENTION

This invention relates generally to wireless communication systems and more specifically to a Base Station Subsystem (BSS) that makes use of a Base Transceiver System (BTS) that provides for dynamic mapping between terrestrial and radio resource connections.

BACKGROUND OF THE INVENTION

One benefit of the continuing innovation in microelectronics has been the widespread availability of low cost wireless telecommunications equipment. The ability to make and receive telephone calls anywhere through a small pocket-sized handset has universal appeal. However, mobile telephone users are beginning to demand services beyond basic telephony such as paging, caller identification, data and facsimile, and wireless systems are thus beginning to include the features needed to support such advanced services.

One system having these features is the so-called Global System for Mobile Communications (GSM) system and related variants such as DCS-1800 and PCS-1900. The various subsystems of a GSM system are known by certain standardized terminology, including the Mobile Station (MS), Base Station Subsystem (BSS), and the Network Switching Subsystem (NSS). In general, the BSS is responsible for maintaining transmission and reception along the radio path, and the NSS is responsible for managing landline connections. The Mobile Station (MS) is the term used to refer to the handset.

The BSS typically includes two functional machines, a Base Transceiver System (BTS) and a Base Station Controller (BSC). The BTS encompasses radio transmission and reception equipment that provides over-the-air connections to the Mobile Station (MS). Each BTS typically serves the Mobile Stations (MS) located in a small area, or cell, of the total area assigned to the service provider.

The BSC is typically a small switching system with call processing features and computational capacity. Its main role is to manage the handover of calls as a Mobile Station (MS) moves between cells. To accomplish this, the BSC performs functions such as radio frequency assignment, handover (HO), channel management (CH-MGMT), and channel measurement (MSMT). A single BSC is typically responsible for managing handover between a number of BTSs.

One consequence of the above architecture is that a number of limitations can arise. For example, as the number of BTSs is increased, the processing load on the BSC increases. This becomes particularly problematic where multiple BTSs are needed in order to serve a single cell, such as may come about in high density traffic areas where cells may need to be sectorized, that is, divided into sectors. Frequency assignments and intra-cell handovers must be made in this situation as though each sector were independent of the adjacent sectors. The BSC workload thus increases accordingly.

A more recent development is the broadband Base Transceiver System (BTS). The broadband BTS permits a greater number of radio channels to be processed efficiently in parallel. Therefore it becomes possible for a cellular service provider to deploy many more channels in a cell than was previously possible, enabling a greater number of users to be served for a given cost.

However, the use of a broadband BTS also increases the amount of data which must pass between the BTS and the BSC, in order to process the greater number of handovers. For example, measurement (MSMT) reports can be expected to be sent approximately twice per second from the Mobile Station (MS) to the BTS. The BTS in turn, must collect these reports and forward them to the BSC for processing. This in turn taxes the ability of the BSC to manage a given number of BTS's. Indeed, where before a single BSC may have been quite capable of servicing multiple cells, with broadband BTSs, it may even become necessary to have a single BSC servicing each cell.

Therefore, it is clear that when a broadband BTS is to be deployed, techniques are needed wherein the BSC functions can be more effectively implemented.

DESCRIPTION OF THE INVENTION

Objects of the Invention

It is therefore an object of this invention to minimize the interaction between a Base Station Controller (BSC) and Base Transceiver System (BTS) in a wireless communication system such as a Global System for Mobile Communications (GSM) system.

Another object is to reduce the functionality required of such a Base Station Controller (BSC).

It is a further object to provide a mechanism for connecting Mobile Stations (MS) to available terrestrial channels which requires as little involvement by the Base Station Controller (BSC) as possible during intra-cell handover.

SUMMARY OF THE INVENTION

Briefly, the invention is a wireless communication system which employs a number of Base Transceiver Systems (BTS) and at least one Base Station Controller (BSC) to manage the connection of Mobile Stations (MS) to a terrestrial telephone network. As the Mobile Stations (MS) move between cells, measurement data required to support certain types of handover decisions are maintained in the BTS, rather than simply forwarding the data to the BSC. Such measurement data may include real-time measurements such as downlink transmission quality, bit error rate, downlink reception level, and downlink reception level at neighboring cells. Because this measurement data is maintained in the BTS, the BTS itself is thus capable of performing the required decision process for handovers. Only when the BTS makes a determination that it cannot perform or accomplish the required handover, must it then escalate the decision to the BSC.

If the situation requires a handover within the channels managed by the BTS, handover can be processed by the BTS exclusively, without involving the BSC. This is because the BTS also includes a mechanism for a remapping of radio channels to specific landline connections through the BSC.

More particularly, the invention provides for an allocable mapping between air interface channels (Um) and landline interface traffic channels (Abis) via an element referred to as a Dynamic Resource Manager (DRM). The DRM is responsible for maintaining a logical channel identification (ID) to be used by all BTS call processing applications. The logical channel ID is a mapping of a particular radio channel, timeslot number, frame sequence and channel sequence to a unique logical ID number. The DRM is also responsible for mapping a list of terrestrial channels to logical ID numbers.

There are several advantages to this arrangement. The system architecture allows a greater number of BTS to be supported by a given BSC. In addition, a significant amount of message traffic is eliminated between the BSC and BTS. This permits execution of an intracell handover decision at a much faster rate than would otherwise be possible. Furthermore, deployment costs are less since a single BSC can control a greater number of BTSs.

BRIEF DESCRIPTION OF THE DRAWINGS

For a more complete understanding of the invention and its novel advantages and features, please refer to the accompanying drawings in which.

DETAILED DESCRIPTION OF A PREFERRED EMBODIMENT

Figure 1:
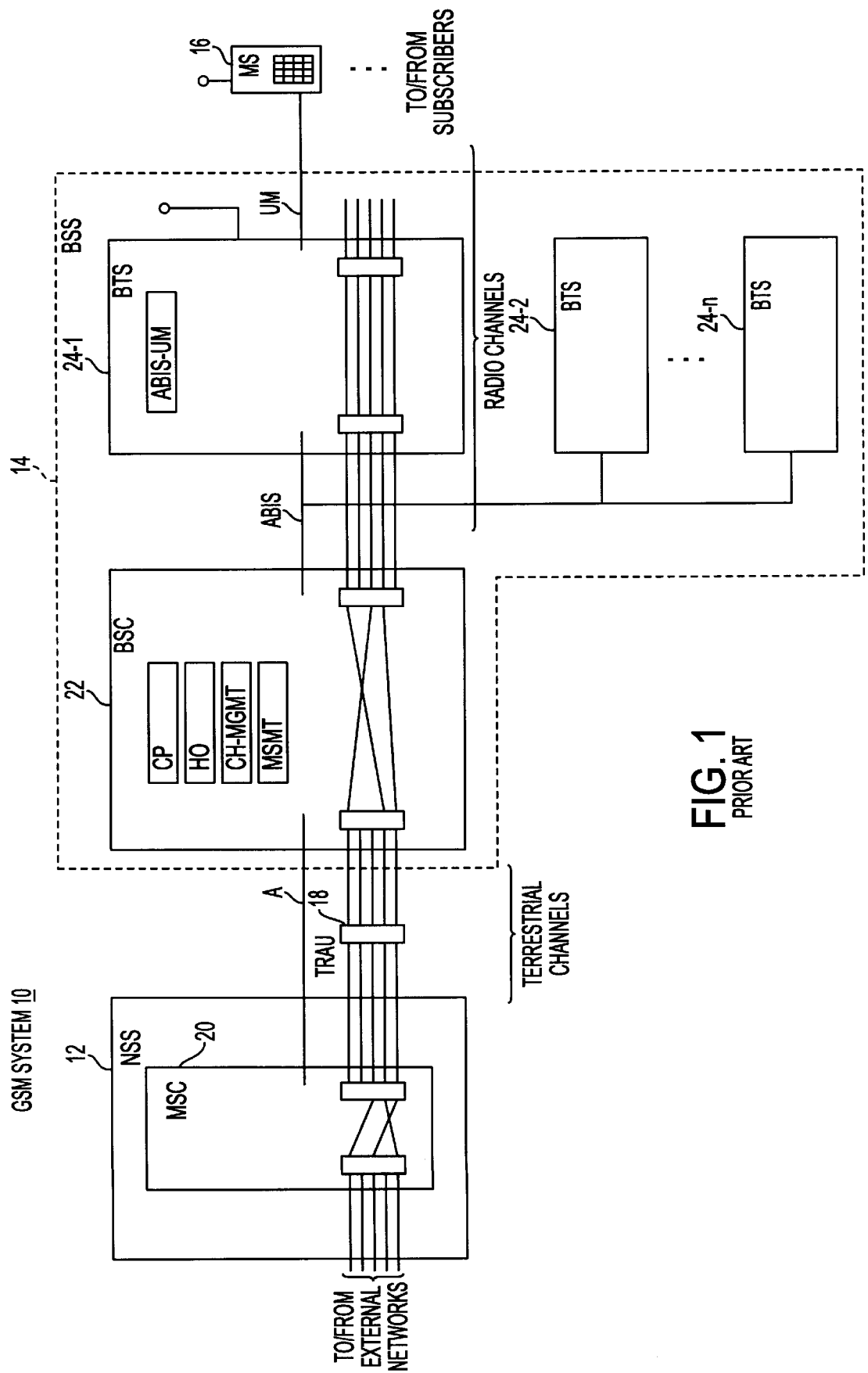
FIG. 1 is a block diagram of the components of a prior art wireless communication system.

FIG. 1 is a block diagram of a prior art wireless communication system 10 such as a Global System for Mobile (GSM) Communication system, or a GSM derivative such as PCS-1900 or DCS-1800. The system 10 includes a Network Switching Subsystem (NSS) 12, a Base Station Subsystem (BSS) 14, and Mobile Stations (MS) 16.

The Mobile Stations (MS) 16 represent the equipment that the typical end-user physically sees and interacts with. The Mobile Stations (MS) 16 may include not only vehicle-mounted equipment but also portable and handheld equipment as well.

The NSS 12 serves as the interface between the system 10 and external telephone networks such as a Public Switched Telephone Network (PSTN). The NSS 12 includes a switch adapted for mobile telephony called a Mobile Switching Center (MSC) 20. The NSS 12 is also considered here to include a Transcoder Rate Adapter Unit (TRAU) 18 which is responsible for coordinating speech encoding and decoding and sample rate adaptation, although the TRAU 18 is sometimes considered to be part of the BSS 14. Communication between the BSS 14 and MSC 20 occurs over an interface, known as the A interface, which is specified by the GSM standard.

In general, the components of the BSS 14 may be divided into two principal functionalities including a Base Transceiver System (BTS) 24 and a Base Station Controller (BSC) 22. The Base Station Controller (BSC) 22 is primarily responsible for coordinating communication with the NSS. The BTS 24 is responsible for radio communication with the Mobile Stations (MS) 16 through a radio interface (Um). There are usually a number of BTS 24 in any given system 10, with each BTS 24 being responsible for communicating with the Mobile Stations 16 located in a particular sub-area, or cell, of the geographic coverage area of the system 10. The typical BSC 22 may thus manage a number of BTSs 24, with the exact number of BTS depending upon the expected traffic capacity. The BSC 22 and BTS 24 communicate with one another over an interface known as the Abis interface in GSM terminology.

The BSC 22 is a switch, of smaller scale than the MSC 20, and typically includes at least some computing capability.

The BSC 22 in a prior art system includes software which performs at least four tasks, or processes, including Call Processing (CP), Handover (HO), Channel Management (CH-MGMT) and Measurement (MSMT).

The Call Processing (CP) process is responsible for setting up, maintaining and taking down connections from the external network through the MSC 20 to the radio channels in the BSTs 24.

In order to support continuing connections of users of the Mobile Stations 16 as they move within the system 10, such users need to change their point of access, through a different BTS 24. In the standard GSM system 10, it is the job of the BSC 22 to perform this mobility or Handover (HO) task. The Handover (HO) process performed in the BSC 22 makes use of information collected during the measurement (MSMT) process for supporting a handover decision. The MSMT process typically includes measuring of data indicating the receive power levels from the Mobile Stations 16. These reports occur at a rate of twice per second for each active (that is, powered on) Mobile Station (MS) in the system. In a standard MSMT process, the data is collected from the Mobile Stations (MS) in the BTS 24 and then forwarded over the Abis interface for use by the BSC 22.

When the measurement (MSMT) process indicates that a handover to a new cell is needed, the handover (HO) process in the BSC 22 switches a terrestrial connection from the MSC 20 to a different radio channel Um.

The BSC 22 thus must also manage the radio channels (Um) via a channel management (CH-MGMT) process. This process keeps track of which radio channels (Um) are available in which BTS 24 and the mapping of A-interface channels to Abis channels.

This architecture works well for its intended purpose, and, indeed GSM has become the most popular digital cellular system in the world. A number of difficulties are observed as a consequence of the above process allocations, however. For example, as the number of BTSs 24 is increased to service a greater number of cells, the number of data transfers that the Abis interface is expected to support increases. This requirement becomes particularly exacerbated in a situation where the expected demand for use by the Mobile Stations 16 is relatively high. For example, in various situations the number of Mobile Stations 16 in a cell may be so high that the cell needs to be sectorized, or divided into sub-regions called sectors. Depending upon demand, a BTS 24 may be needed to service each sector of the cell.

While increasing the available number of radio channels allows a greater number of Mobile Stations to be serviced in a particular cell, it also greatly increases the work load of the BSC 22. Indeed, whereas before a single BSC 22 may have been able to serve multiple cells, it may even become necessary at some point to have a single BSC 22 serving every single cell.

Figure 2:
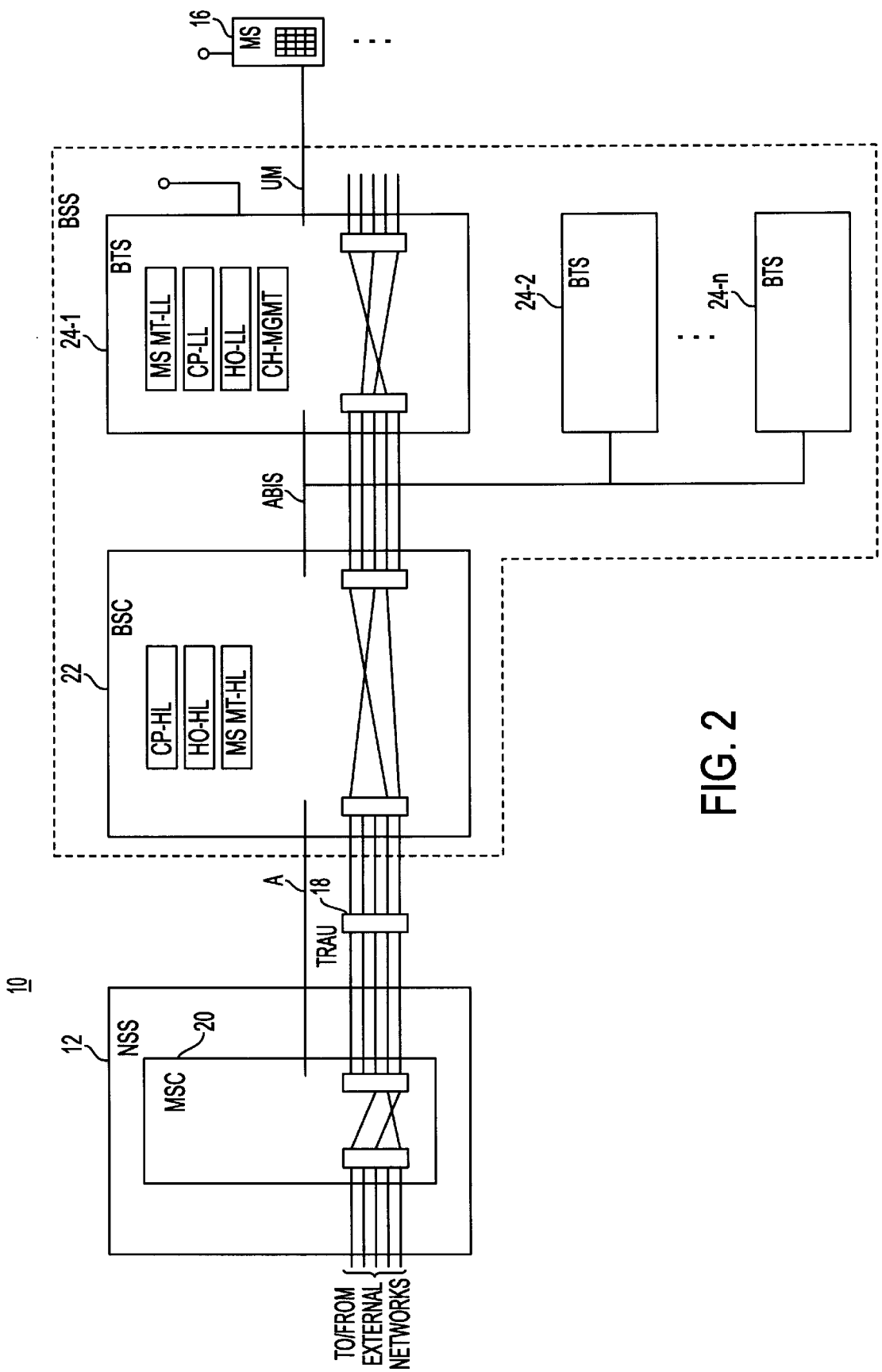
FIG. 2 is a block diagram of a wireless communication system according to the invention showing the allocation of mobility management features to the BTS as well as the channel mapping capability.

FIG. 2 is a block diagram of a wireless communication system making use of the invention which overcomes these shortcomings of the prior art system. In this approach, certain low level measurement processes (MSMT-LL) are the responsibility of the BTS 24 rather than the BSC. These low level measurement processes (MSMT-LL) not only measure data but also maintain certain data as reported by the Mobile Stations (MS) 16 to support handover (HO) decisions, such as maximum transmission power, downlink transmission bit error rate, downlink reception level, and downlink reception level at neighboring BTSs. Thus, only higher level measurement functions (MSMT-HL) need be performed in the BSC 22.

Also necessary to support the redistribution of mobility functionality is the implementation of a switching capability in the BTS together with a non-static, or allocable mapping between the radio channels (Um) and the Abis traffic channels. The ability to allocate channels permits the BTS 24-1 to effect an intracell handover by remapping a given radio channel (Um) to the same Abis traffic channel without requiring involvement by the BSC 22. This lower level handover process (HO-LL) can thus now be implemented entirely in the BTS 24-1.

It is only when a BTS 24-1 cannot perform the required level of handover, such as when the mobile station is moving into a sector controlled by another BTS 24-2, does the decision need to be escalated to the BSC 22 level for high level handover (HO-HL) processing.

Call processing logic is thus also divided into higher level functionality (CP-HL) and assigned to the BSC 22 and lower level functionality (CP-LL) assigned to the BTS 24.

Figure 3:
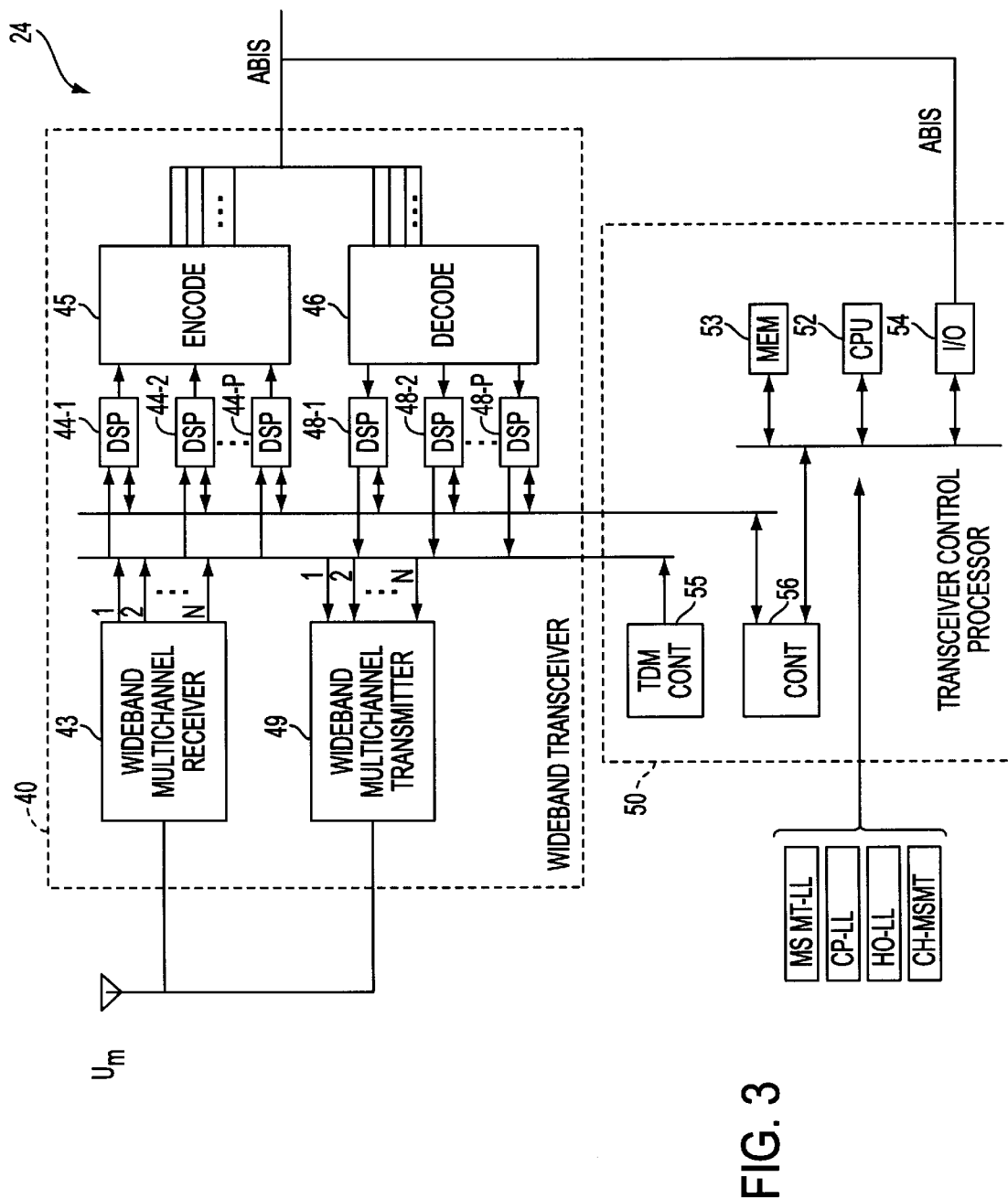
FIG. 3 is a detailed block diagram of a BTS according to the invention.

Turning attention now to FIG. 3, an exemplary Base Transceiver System (BTS) 24 used in the invention consists of a wideband transceiver portion 40 and transceiver control processor 50. The wideband transceiver 40 acts as the interface for the radio channels Um, and includes wideband receiver 43 and wideband transmitter 49 equipment to provide access to a number of contiguous receive and transmit channels simultaneously. The transceiver control processor 50 coordinates the operation of the transceiver 40 according to commands received from the BSC 22 over the Abis interface.

The wideband multichannel receiver 43 and transmitter 49 are wideband in the sense that they cover a substantial portion of the radio frequency bandwidth available to the service provider who is operating the base station 24. For example, the wideband receiver 43 may downconvert a 15 MegaHertz (MHz) bandwidth in the 800–900 MHz range which may contain as many as 25 GSM carrier signals, each having an approximately 200 kiloHertz (kHz) bandwidth, and with each carrier signal containing up to eight (8) GSM channels.

The wideband multichannel receiver 43 consists of a downconverter, analog-to-digital (A/D), and one or more digital filter bank analyzers (not shown) which provide N channel signals as an output. A plurality of Digital Signal Processors (DSPs) are programmed to operate as demodulators 44-1, 44-2, . . . , 44-p (collectively demodulator DSPs 44). The demodulator DSPs 44 are in turn connected to the wideband multi-channel receiver 43 via a Time Division Multiplex (TDM) bus. The TDM bus permits any of the N receiver outputs to be connected to any of the DSPs 44. The demodulator DSPs 44 each provide one of the demodulated radio signals at its output. An encoder 45 is used to encode the outputs of the demodulator DSPs 44 into a suitable signaling format for transport over the Abis interface to the MSC 22.

The wideband transceiver 40 performs the reciprocal functions in the transmit direction. In particular, a decoder 46, a plurality of modulator DSPs 48-1, 48-2, . . . , 48-p, each of which receive one of the channel signals at an input, a filter bank combiner, and digital to analog converter provide a composite modulated signal to the wideband multi-channel transmitter 49.

A co-pending United States patent application entitled "Transceiver Apparatus Employing Wideband FFT Channelizer with Output Sample Timing Adjustment and Inverse FFT Combiner for a Multichannel Communication Network" filed Apr. 8, 1994 and which is assigned to AirNet Communications Corporation, the assignee of this application, describes a preferred embodiment of the wideband multichannel receiver 43 and transmitter 49 in greater detail.

The transceiver control processor 50 is a computer, such as a microcomputer, and includes a central processing unit (CPU) 52, a memory 53, and an input/output interface 54. The I/O interface 54 is used to receive control signaling from the BSC 24 over the Abis interface. To provide the switching function necessary in the BTS needed to support an allocable mapping between radio channels (Um) and Abis channels, the transceiver control processor 50 makes use of a Time Division Multiplex (TDM) bus controller 55 and a VME bus controller 56.

The transceiver control processor 50 performs the processes listed in FIG. 2 including channel management (CH-MGMT), channel measurement (MSMT-LL), call processing (CP-LL), and lower level handover (HO-LL).

As to the channel management process (CH-MGMT), the TDM bus controller 55 ensures that outputs from the wideband multichannel receiver 43 are asserted in a defined order to particular ones of the demodulator DSPs 44. Likewise, the TDM controller 55 ensures that outputs of the modulator DSPs 48 are asserted in the defined order to the N inputs of the wideband multi-channel transmitter 49. The TDM controller 55 accomplishes this in a known fashion such as by using a TDM bus time slot counter and time slot memory to determine the order of connections. The VME controller 56 is used to pass known real time control information to the DSPs 44 and 48 and other components of the wideband transceiver 40.

It can now thus be understood how the channel management process (CH-MGMT) can maintain a mapping between the radio interface channels (Um) and Abis traffic channels, through the use of the TDM bus. Because this connection of radio channels (Um) is under control of the transceiver control processor 50 in the BTS 24, the BTS itself can perform a handover by re-mapping a new one of the radio channels (Um) to the same Abis traffic channel without involving the BSC.

The handover decision in the transceiver control processor 50 is made in the same logical manner as for the conventional GSM system of FIG. 1 by making use of a measurement data process (MSMT) to determine when a Mobile Station 16 is in a physical location indicating that a handover is required.

Figure 4:
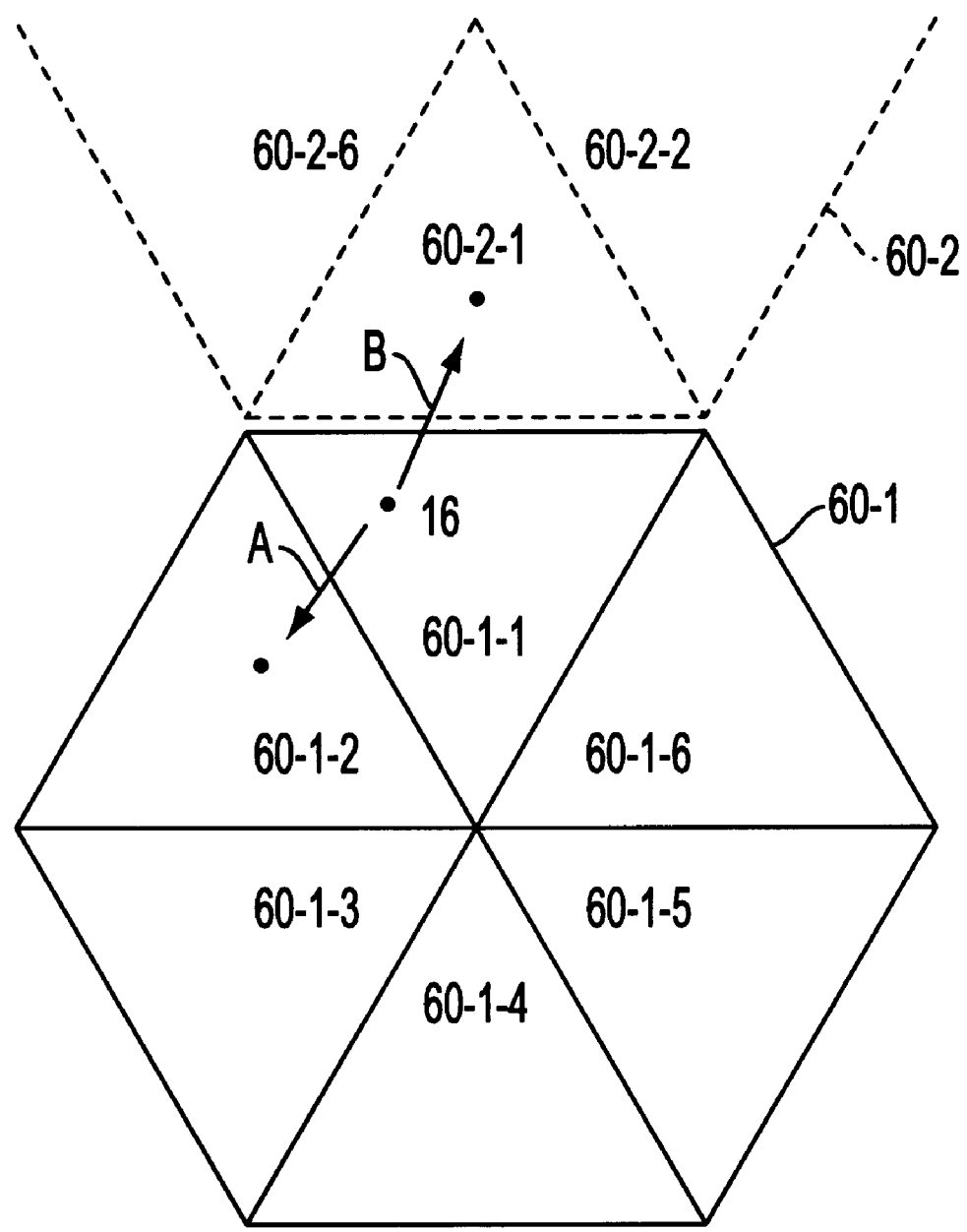
FIG. 4 is a diagram of a cell in a wireless communication system illustrating a first mobile unit moving intracell and a second mobile unit moving intercell.

The interaction of the BTS 24 and BSC 22 during both intercell handover and intracell handover can be understood with reference to FIG. 4. The figure shows a diagram of an idealized cell 60-1 in a wireless communication system and an adjacent cell 60-2. The cell 60-1 is sectorized into six 60 degree sectors, 60-1-1, 60-1-2, . . . , 60-1-6. Similarly, the adjacent cell 60-2 is sectorized into sectors 60-2-1, 60-2-2, . . . , 60-2-6.

When a Mobile Station (MS) 16 located in sector 60-1-1 moves toward sector 60-1-2 in the direction of arrow A, it eventually reaches a point crossing a boundary between 60-1-1 and sector 60-1-2 where the need for a handover from operation on one of the radio channels (Um) assigned to sector 60-1-1 to a radio channel (Um) assigned to sector 60-1-2 is indicated. At this point, the low level measurement process (MSMT-LL) in BTS 24-1, has for example, determined that the receive power level from the Mobile Station 16 as received in sector 61-1-1 is lower than the receive power level in sector 60-1-2. When the low level measurement process (MSMT-LL) indicates an intracell handover is required, the channel measurement process (CH-MGMT) is initiated to switch the call from sector 60-1-1 being received on one of the N radio channels in the wideband transceiver 40, to a different one of the N radio channels, by indicating a new address for the TDM controller 55. Thus a connection from a different one of the N radio channels is made to the same demodulator DSP 44 and demodulator DSP 48 that were previously handling the call. The connection parameters on the Abis side through the BSC 24 and MSC 20 (FIG. 2) can thus also remain the same.

In a situation where the Mobile Station (MS) 16 is traveling in the direction of arrow B from a location in sector 60-1-1 to a sector 60-2-1 in an adjacent cell 60-2 served by a different BTS 24, the measurement lower level process MSMT-LL will again indicate that a handover is required for the Mobile Station (MS) 16. However, in this instance the channel management process (CH-MGMT) recognizes that the new candidate cell for the Mobile Station 16 is not among the cells being handled by the presently serving BTS 24. It is only at this point, after an attempt is made to process the handover as an inter-cell handover, that the BSC 24 becomes involved in the process as in a conventional GSM system.

What is claimed is:

1. A system for providing wireless communication among a plurality of Mobile Stations, MS, as the Mobile Stations move between portions, or cells, of a geographical area, comprising:

A. Base Station Controller, BSC, means, for coordinating communication to an external network over a plurality of terrestrial channels;

B. a plurality of Base Transceiver System, BTS, means for coordinating communication with Mobile Stations, MS, over a plurality of radio channels, Um, each BTS connected to a plurality of the terrestrial channels, and wherein each of the BTS means further comprises:
      (i) radio transceiver means for receiving and transmitting radio signals over a plurality of the radio channels, Um;
      (ii) means for assigning the use of the plurality of radio channels in each BTS means among at least two cell portions;
      (iii) measurement means, connected to the radio transceiver means, for collecting and maintaining measurement, MSMT, data as the Mobile Stations, MS, move between cell portions;
      (iv) channel connection means, for providing a switchable connection between the plurality of the radio channels, Um, and a plurality of the terrestrial channels; and
      (v) dynamic resource manager means for providing for an allocable mapping between radio channels, Um, and terrestrial channels by maintaining a logical channel identification to be used by the BTS.

2. A system as in claim 1 additionally comprising:
   (vi) handover means, connected to receive the MSMT data, for performing handover when the MSMT data indicates that a Mobile Station, MS, has moved into a different cell portion under control of the BTS means, by activating the channel connection means to switch the terrestrial channel associated with the Mobile Station, MS, to a new radio channel Um while still using the same terrestrial channel as input to the BTS means; and
   (vii) handover request means, connected to receive the MSMT data, for sending a handover request message to the BSC means when the MSMT data indicates that a Mobile Station, MS, has moved into a different cell portion which is not under control of the BTS means.

3. A system as in claim 2 wherein the handover means additionally includes mapping means, for mapping the radio channels, Um, to specific terrestrial connections through the BSC means.

4. A system as in claim 1 wherein the cell portions are sectors of the same cell.

5. A system as in claim 4 wherein intracell handovers involving sectors of the same cell are processed by the BTS means.

6. A system as in claim 1 wherein the MSMT data additionally includes real time measurement data taken the set of downlink transmission quality data, bit error rate data, downlink reception level data, and downlink reception level at neighboring cell data.

7. A system as in claim 1 wherein the dynamic resource manager means maintains a logical channel identification as a mapping of a particular radio channel to a logical identification number, and the dynamic resource manager means provides an allocable mapping of terrestrial channels to logical identification numbers.

8. A system as in claim 7 wherein the logical channel identification further includes a mapping of a timeslot number to the logical identification number.

9. A system as in claim 7 wherein the logical channel identification further includes a mapping of a frame sequence to the logical identification number.

10. A system as in claim 7 wherein the logical channel identification further includes a mapping of a channel sequence to the logical identification number.

11. A system as in claim 1 wherein the measurement means additionally comprises:
    (i) low level measurement process means, MSMT-LL, for determining whether an intracell handover is required by determining when a receive power level from a Mobile Station, MS, as received in a cell portion is lower than a receive power level as received in an adjacent cell portion served by the same BTS means; and
    (ii) channel management process means, CH-MGMT, for activating the channel connection means to switch a connection from one of the radio channels, Um, presently serving the Mobile Station to a different one of the radio channels in the BTS means, when the low level measurement process means, MSMT-LL, indicates an intracell handover is required.

12. In a system for providing wireless communication for a plurality of Mobile Stations, MS, communicating over a plurality of radio channels, Um, and a plurality of terrestrial channels, said Mobile Stations located in a geographical area divided into cells, a Base Transceiver System, BTS, comprising:
    (i) radio transceiver means for receiving and transmitting radio signals over a plurality of radio channels, Um;
    (ii) means for assigning the use of the plurality of radio channels in the BTS among at least two portions of one of said cells;
    (iii) measurement means, connected to the radio transceiver means, for collecting and maintaining measurement, MSMT, data as the Mobile Stations, MS, move between cell portions;
    (iv) channel connection means, for providing a switchable connection between the plurality of the radio channels, Um, and a plurality of the terrestrial channels; and (v) dynamic resource manager means for providing for an allocable mapping between the plurality of radio channels, Um, and the plurality of terrestrial channels by maintaining a logical channel identification to be used by the BTS.

13. A Base Transceiver System as in claim 12, wherein said Base Station Transceiver communicates with Base Station Controller, BSC, means, said BSC means for coordinating communication to an external communications network over said plurality of terrestrial channels, said Base Transceiver System additionally comprising:

(vi) handover means, connected to receive the MSMT data, for performing handover when the MSMT data indicates that one of said plurality of Mobile Stations, MS, has moved into a different cell portion under control of the BTS, by activating the channel connection means to switch the terrestrial channel associated with the Mobile Station, MS, to a new one of the plurality of radio channels Um while still using the same terrestrial channel as input to the BTS; and (vii) handover request means, connected to receive the MSMT data, for sending a handover request message to an associated Base Station Controller, BSC, when the MSMT data indicates that a Mobile Station, MS, has moved into a different cell portion which is not under control of the BTS.

14. A Base Transceiver System as in claim 12 wherein the dynamic resource manager means maintains a logical channel identification as a mapping of a particular radio channel to a logical identification number, and the dynamic resource manager means provides an allocable mapping of terrestrial channels to logical identification numbers.

15. A Base Transceiver System as in claim 12 wherein the logical channel identification further includes a mapping of a timeslot number to the logical identification number.

16. A Base Transceiver System as in claim 12 wherein the logical channel identification further includes a mapping of a frame sequence to the logical identification number.

17. A Base Transceiver System as in claim 12 wherein the logical channel identification further includes a mapping of a channel sequence to the logical identification number.

18. A Base Transceiver System as in claim 12 wherein the measurement means additionally comprises:

(i) low level measurement process means, MSMT-LL, for determining whether an intracell handover is required by determining when a receive power level from a Mobile Station, MS, as received in a cell portion is lower than a receive power level as received in an adjacent cell portion served by the same BTS; and (ii) channel management process means, CH-MGMT, for activating the channel connection means to switch a connection from one of the radio channels, Um, presently serving the Mobile Station to a different one of the radio channels in the BTS, when the low level measurement process means, MSMT-LL, indicates an intracell handover is required.

* * * * *

UNITED STATES PATENT AND TRADEMARK OFFICE
CERTIFICATE OF CORRECTION

PATENT NO. : 5,953,668
DATED : September 14, 1999
INVENTOR(S) : Patrick L. Reilly It is certified that error appears in the above-identified patent and that said Letters Patent is hereby corrected as shown below:

In Claim 6, Column 8, Line 14, insert the word "from" between the words "taken" and "the".

Signed and Sealed this

First Day of August, 2000

*Attest:*

*Attesting Officer*

Q. TODD DICKINSON
*Director of Patents and Trademarks*